United States Patent
Wagener

[11] Patent Number: 6,045,379
[45] Date of Patent: Apr. 4, 2000

[54] DEVICE CONNECTING CONDUCTORS OR DEVICES TO A BUS BAR IN A BUS BAR SYSTEM

[75] Inventor: Hans Wagener, Dietzhölztal, Germany

[73] Assignee: Rittal-Werk Rudolf Loh GmbH Co. KG, Herborn, Germany

[21] Appl. No.: 08/913,437

[22] PCT Filed: Mar. 1, 1996

[86] PCT No.: PCT/EP96/00866

§ 371 Date: Jun. 2, 1998

§ 102(e) Date: Jun. 2, 1998

[87] PCT Pub. No.: WO96/28869

PCT Pub. Date: Sep. 19, 1996

[30] Foreign Application Priority Data

Mar. 10, 1995 [DE] Germany ............ 195 08 522

[51] Int. Cl.⁷ .................................. H01R 4/60
[52] U.S. Cl. ............................................ 439/212
[58] Field of Search ................. 439/798, 212, 439/213

[56] References Cited

U.S. PATENT DOCUMENTS

| | | |
|---|---|---|
| 3,210,716 | 10/1965 | Meacham ................ 339/21 |
| 3,337,697 | 8/1967 | Martin ................... 439/213 |
| 4,030,794 | 6/1977 | Rozenboom ............. 439/213 |

*Primary Examiner*—Renee S. Luebke
*Assistant Examiner*—Javaid Nasri
*Attorney, Agent, or Firm*—Jansson, Shupe, Bridge & Munger, Ltd.

[57] ABSTRACT

The invention relates to a device for connecting conductors devices to a busbar of a busbar system in which the busbar has an n-agonal cross-section (n≧3) with longitudinal undercut acceptor grooves in its outer sides. A simple type of connection is provided in that the acceptor grooves are T-shaped, mating electrically conductive inserts extending over part of the length of the busbar can be fitted into the undercut rectangular cross-section parts of the groves and the inserts have connectors projecting from the section to which the conductors can be directly connected or devices can be fitted by ways of connecting contacts.

11 Claims, 2 Drawing Sheets

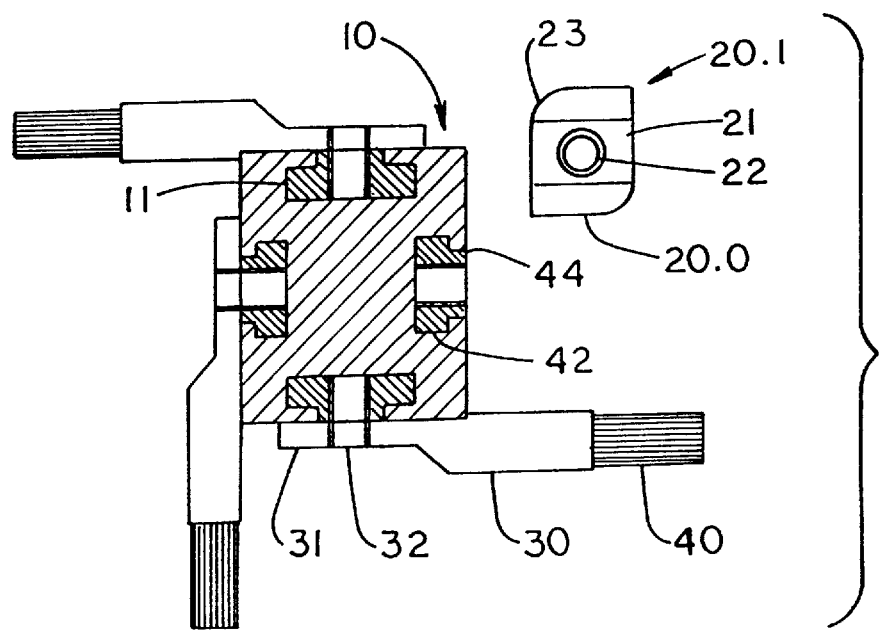
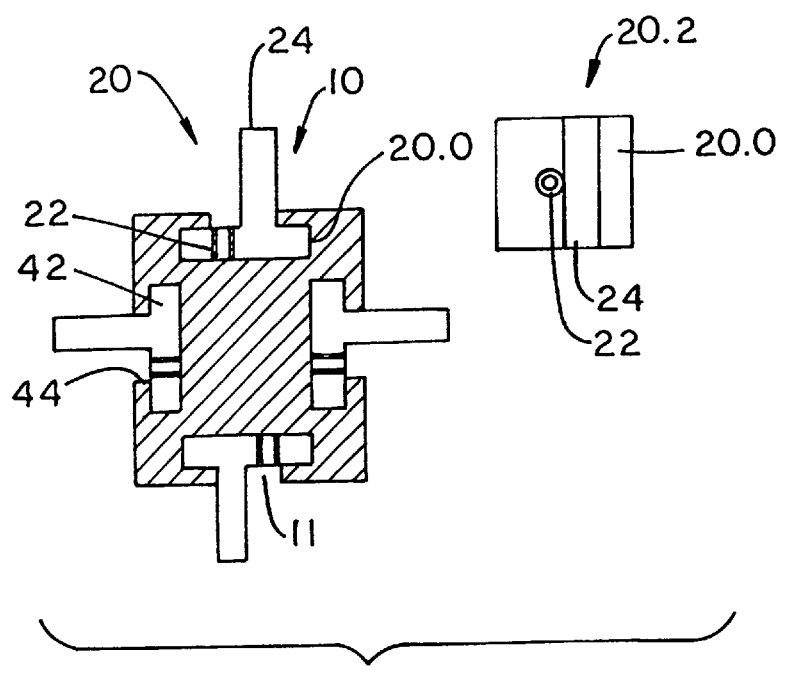

DEVICE CONNECTING CONDUCTORS OR DEVICES TO A BUS BAR IN A BUS BAR SYSTEM

RELATED APPLICATION AND CLAIM OF PRIORITY

This application is a continuation of PCT Application No. PCT/EP96/00866 having an international filing date of Mar. 1, 1996.

FIELD OF THE INVENTION

This invention relates to electrical connections generally and, more specifically, to connections involving the use of a bus bar system.

BACKGROUND OF THE INVENTION

Bus bars for large amounts of current require a large cross-section, which then no longer permits the connection of leads and equipment in the known manner by means of simple plug-in connection or by means of simple connecting adapters. Therefore, bus bars with cross-sections with n corners (n≧3) have been considered which feature longitudinally directed, recessed receptacle grooves on their sides.

OBJECTS OF THE INVENTION

It is an object of this invention to provide an apparatus to connect leads or devices to a bus bar of a bus bar system that overcomes some of the problems and shortcomings of the prior art.

Another object of the invention is to provide an apparatus to connect leads or devices to a bus bar of a bus bar system that make possible in a simple manner, the connection of leads or devices to a bus bar having at least four corners. How these and other important objects are accomplished will be apparent from the following descriptions and from the drawings.

SUMMARY OF THE INVENTION

The invention involves an improvement to an apparatus for connecting leads or devices to a bus bar system. Said apparatus is comprised of a bus bar having at least three outer sides therealong wherein a plurality of the outer sides each have a receptacle groove formed in them and extending therealong. The improvement is comprised of the receptacle groove being substantially T-shaped in cross-section with a cross-portion within the bus bar and a base portion opening along the outer side. Conductive inserts are located within each one of the receptacle grooves. Each insert is adapted to the cross-section of the cross-portion and extends along a part of the length of the bus bar. A series of connecting pieces attached to the inserts are adapted to the base portion of the receptacle groove whereby the insert and connecting piece are provided with a threaded aperture that passes through the connecting piece.

In one embodiment of the invention, the cross-portion has a first cross-sectional area, the base portion has as a second cross-sectional area and the second cross-sectional area is narrower than the first cross-sectional area. In such embodiment, the conductive inserts have four corners. Two of the corners diagonally opposed to each other are rounded and the diagonal distance between the rounded corners is determined by the cross-sectional area of the base portion.

In another embodiment, at least one conductive insert is placed in each of a plurality of bus bars and the bus bars are coupled together via the conductive inserts.

In a preferred embodiment of the invention, each of the conductive inserts is adapted to the cross-section of the cross-portion and extends along a part of the length of the bus bar. The inserts each have a connecting piece projecting from the receptacle groove of the bus bar and a threaded aperture therethrough adjacent to the connecting piece and accessible when the inserts are positioned in the cross-portion.

In a specific version of the preferred embodiment, the connecting piece has a thickness that is less than the cross-sectional area of the base portion. In such version, the base portion of the receptacle groove has at least one wall and the connecting piece is molded onto the insert piece in such a manner that it abuts the wall of the base portion.

In another version of the preferred embodiment, the connecting piece is molded onto the insert in such a manner that when the insert is placed in the receptacle groove, the connecting piece is centered in the base portion of the receptacle groove.

In yet another version, the connecting piece has a free end and a holding member is joined at a right angle to the free end of the connecting piece.

In still another version of the preferred embodiment, at least one conductive insert is placed in each of a plurality of bus bars and the bus bars are coupled together via the conductive inserts.

BRIEF DESCRIPTION OF THE DRAWINGS

FIG. 1 is a rectangular bus bar with insert pieces to directly screw on leads that are provided with terminals.

FIG. 2 is a bus bar with insert pieces that have a member onto which devices that are provided with appropriate contacts can be plugged in.

DETAILED DESCRIPTION OF THE INVENTION

Figure 3:
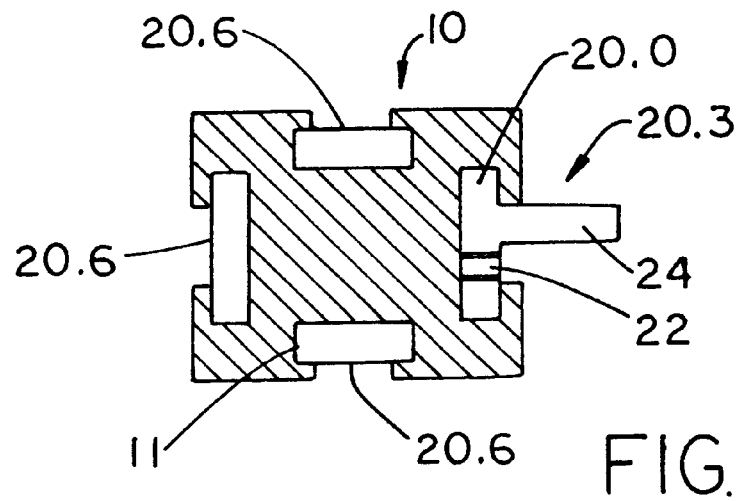
FIG. 3 is a bus bar with insert pieces designed and used as couplers.

As shown in FIG. 1, this invention involves an apparatus for connecting leads or devices to a bus bar system. The bus bar 10 has an essentially rectangular shape and includes at least on longitudinally directed recessed T-shaped receptacle groove 11 in each of its sides. Such grooves 11 have a cross-portion 42 for the T's cross bar and a narrower base portion 44 for the T's base. Insert pieces 20.1 to 20.5 featuring a base plate 20.0 are placed in the receptacle grooves 11. The longer dimension of the base plate 20.0 is determined by the width of the wider section of the T-shaped receptacle groove 11 while its smaller dimension extends along a part of the length of the receptacle groove 11. Rectangular connecting pieces 21 are attached to the upper side of the insert's base plate 20.0. The shorter dimension of the connecting piece 21 is determined by the width of the narrower section of the receptacle groove 11. These connecting pieces 21 can be inserted into receptacle groove 11 of the bus bar 10 in the corresponding position on the front side. A central threaded aperture 22 extends through the connecting piece 21 and the base plate 20.0, so that leads 40 that are provided with terminals 30 can be screwed on directly. The fastening screw is guided through the bore hole 32 in fastening flange 31 of the terminal 30 and screwed onto the threaded aperture 22. The base plate 20.0 is thereby tightened in the receptacle groove 11 and a good connection is thereby established.

As is indicated by the rounded section 23 on the base plate 20.0 of the insert piece 20.1, these can also be inserted crosswise with respect to the receptacle groove 11, if the diagonal dimension of the rounded sections 23 is determined by the width of the narrower section of the receptacle groove 11 that is shaped as a T-groove. The connecting piece 21 must thereby also have the appropriate dimension.

As is shown in FIG. 2, the insert pieces 20.2 can also feature a member 24 as the connecting piece for plugging on devices. The member 24 is molded onto the base plate 20.0 so that is abuts a wall of the narrower section of the receptacle groove 11 when it has been inserted. A sufficient space thereby exists next to the member 24 such that a threaded aperture 22 is accessible through the receptacle groove 11 if the member 24 features a thickness which is smaller than the width of the narrower section of the receptacle groove 11. The base plate 20.0 is tightened into the receptacle groove 11 by means of a set screw (not shown). Devices provided with appropriate contacts are plugged onto the members 24, as with known bus bar systems with upright, rectangular bus bars.

The bus bar 10 according to FIG. 3 has an insert piece 20.3 inserted in a receptacle groove 11, corresponding to the insert pieces 20.2 according to FIG. 2. Insert pieces 20.3 are inserted in the remaining receptacle grooves 11, featuring only a base plate 20.0 and provided with two (not illustrated) threaded apertures. These insert pieces 20.3 are used as couplers and permit bus bars 10 that are next to each other to be connected. The insert pieces 20.3 thereby each project half way to the bordering bus bars 10 and are tightly connected to the bus bars 10 with screws that are screwed into the threaded apertures.

Figure 4:
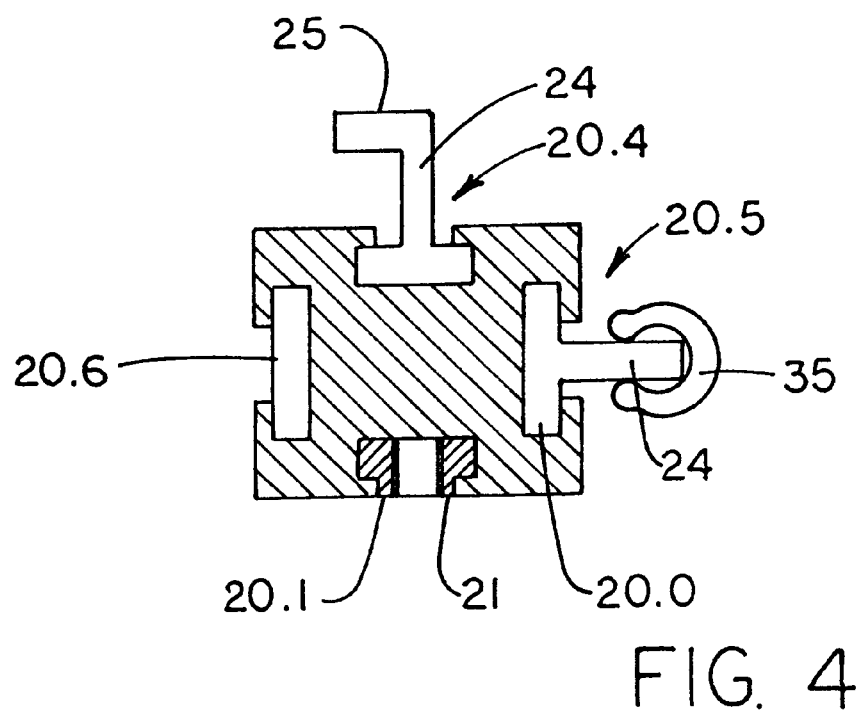
FIG. 4 is a bus bar with varying insert pieces.

Based on FIG. 4 it is shown that, with an insert piece 20.5, the member 24 can also be molded on such that it is arranged in the center of the narrower section of the receptacle groove 11 that is shaped as a T-groove. The base plate 20.0 can thereby be elongated in the longitudinal direction beyond the member 24 and can bear threaded apertures in the elongations in order to tighten the base plate 20.0 into the receptacle groove 11. 35 depicts the contact of a device that can be plugged on.

As is shown on the insert piece 20.4, the end of the member 24 can transition into a holding member 25 that is at a right angle at the end, onto which a device can be attached. The receptacle grooves 11 of the bus bar 10 are occupied by various insert pieces 20.1, 20.4, 20.5 and 20.6 in the exemplified embodiment according to FIG. 4. This is possible because all insert pieces feature a base plate 20.0 that is adapted to the width of the wide section of the receptacle groove 11.

While the principles of this invention have been described in connection with specific embodiments, it should be understood clearly that these descriptions are made only by way of example and are not intended to limit the scope of the invention.

I claim:

1. In bus bar connection apparatus including a bus bar (10) having at least three outer sides therealong, a plurality of the outer sides each having a receptacle groove (11) formed therein and extending therealong, the improvement comprising:

the receptacle groove (11) being integrally formed within the bus bar, the receptacle groove being substantially T-shaped in cross-section with a cross-portion (42) within the bus bar (10) and a base portion (44) opening along the outer side;

a plurality of conductive inserts (20.1–20.5) adapted to the cross-section of the cross-portion (42) and extending along a part of the length of the bus bar (10); and a series of connecting pieces (21) molded to the inserts (20.1–20.5) said pieces adapted to the base portion (44) of the receptacle groove (11), whereby the insert (20.1–20.5) and connecting piece (21) are provided with a threaded aperture that passes through both the insert and the connecting pieces (21).

2. The apparatus of claim 1 wherein:

the cross-portion (42) has a first cross-sectional area;

the base portion (44) has a second cross-sectional area; and the second cross-sectional area is narrower than the first cross-sectional area.

3. The apparatus of claim 2 wherein:

the conductive inserts (20.1) have four corners;

two of the corners diagonally opposed to each other are rounded and separated by a diagonal distance; and the diagonal distance between the rounded corners is determined by the cross-sectional area of the base portion (44).

4. The apparatus of claim 1 wherein:

at least one conductive insert (20.1–20.5) is placed in each of a plurality of bus bars (10); and the bus bars (10) are coupled together via the conductive inserts (20.1–20.5).

5. In bus bar connection apparatus including a bus bar (10) having at least three outer sides therealong, a plurality of the outer sides each having a receptacle (11) formed therein and extending therealong, the improvement comprising:

the receptacle groove (11) being integrally formed within the bus bar, the receptacle groove being substantially T-shaped in cross-section with a cross-portion (42) within the bus bar (10) and a base portion (44) opening along the outer side;

a plurality of conductive inserts (20.1–20.5) each within one of the receptacle grooves (11) each such insert:

adapted to the cross-section of the cross-portion (42) and extending along a part of the length of the bus bar (10);

having a connecting piece (21) molded to the insert in such a manner that the connecting piece projects from the receptacle groove (11) of the bus bar (10); and having a threaded aperture (22) therethrough adjacent to the connecting piece (21) and accessible when the inserts (20.1–20.5) are positioned in the cross-portion (42).

6. The apparatus of claim 5 wherein:

the cross-portion (42) has a first cross-sectional area;

the base portion (44) has a second cross-sectional area; and the second cross-sectional area is narrower than the first cross-sectional area.

7. The apparatus of claim 6 wherein:

the connecting piece (21) has a thickness; and the thickness is less than the cross-sectional area of the base portion (44 ).

8. The apparatus of claim 5 wherein:

the base portion (44) of the receptacle groove (11) has at least one wall; and the connecting piece (21) is molded onto the insert piece (20.1–20.5) in such a manner that it abuts the wall of the base portion (44).

9. The apparatus of claim 5 wherein the connecting piece (21) is molded onto the insert piece (20.1–20.5) in such a manner that when the insert piece (20.1–20.5) is placed in the receptacle groove (11), the connecting piece (21), is centered in the base portion (44) of the receptacle groove (11).

10. The apparatus of claim 5 wherein:

the conductive insert (20.4) has a free end (24); and a holding member (25) is joined at a right angle to the free end (24) of the conductive insert (20.4).

11. The apparatus of claim 5 wherein:

at least one conductive insert (20.1–20.5) is placed in each of a plurality of bus bars (10) are coupled together via the conductive inserts (20.1–20.5).

* * * * *

UNITED STATES PATENT AND TRADEMARK OFFICE
CERTIFICATE OF CORRECTION

PATENT NO. : 6,045,379
DATED : April 4, 2000
INVENTOR(S) : Wagener, Hans

It is certified that error appears in the above-identified patent and that said Letters Patent is hereby corrected as shown below:

Column 2,
Line 45, change "on" to -- one --.

Column 6,
Line 5, between "(10)" and "are" insert -- and the bus bars --.

Signed and Sealed this

Fourteenth Day of August, 2001

Attest:

NICHOLAS P. GODICI
Attesting Officer  Acting Director of the United States Patent and Trademark Office